United States Patent
Rathnavelu

[11] Patent Number: 5,751,709
[45] Date of Patent: May 12, 1998

[54] ADAPTIVE TIME SLOT SCHEDULING APPARATUS AND METHOD FOR END-POINTS IN AN ATM NETWORK

[75] Inventor: Sunder Raj Rathnavelu, Marlboro, N.J.

[73] Assignee: Lucent Technologies Inc., Murray Hill, N.J.

[21] Appl. No.: 580,470

[22] Filed: Dec. 28, 1995

[51] Int. Cl.$^6$ ............................................ H04L 12/56
[52] U.S. Cl. ................................. 370/395; 370/403
[58] Field of Search ........................ 370/60, 60.1, 61, 370/94.1, 94.2, 94.3, 85.5, 85.15, 85.14, 85.4, 95.1, 95.2, 95.3, 85.7, 389, 392, 395, 396, 397, 398, 399, 400, 401, 403, 404, 405, 406–409, 412, 413, 428, 458, 460; 340/825.5, 825.51, 825.52

[56] References Cited

U.S. PATENT DOCUMENTS

| | | | |
|---|---|---|---|
| 5,313,579 | 5/1994 | Chao | 370/94.1 |
| 5,452,297 | 9/1995 | Hilles et al. | 370/94.2 |
| 5,533,009 | 7/1996 | Chen | 370/232 |

Primary Examiner—Dang Ton

[57] ABSTRACT

A scheduling mechanism for satisfying specified Quality of Service (QoS) guarantees for each VC of an end-point host in an ATM network. The scheduling mechanism includes a time slot ring, a VC table and a pending queue. The time slot ring is an array, wherein each element represents a time slot. Each slot contains a pointer which contains the virtual channel identifier (VCID) which is to be serviced in this time slot. The VC table is an array of all the VC descriptors. The pending queue is used for queuing a new VC and also at a later time, when the scheduler is unable to find a time slot for a VC it is queued in the pending queue. The scheduler reads and processes one slot at a time at the maximum speed that the physical link will allow. The scheduler circularly services the slots in the ring continuously and a current slot pointer (CSP) points to the slot being serviced. For the current time slot, the scheduler first services the VC waiting on this slot, then schedules a new target time slot for this VC after marking the current slot empty. The target slot is calculated based on a cell-to-cell spacing parameter and a remainder mechanism is used to correct the average output cell rate to a required rate. In an alternate embodiment, the time slots within the ring are grouped into clusters. The ring contains cluster pointers which point to the first VC to be serviced. The rest of the VCs in the cluster are linked to the first VC. In order to accommodate different classes of service, each entry in the ring holds multiple cluster pointers.

26 Claims, 5 Drawing Sheets

ADAPTIVE TIME SLOT SCHEDULING APPARATUS AND METHOD FOR END-POINTS IN AN ATM NETWORK

RELATED APPLICATIONS

The present patent application is related to U.S. patent application Ser. No. 08/579,961, entitled ADAPTIVE TIME SLOT SCHEDULING APPARATUS AND METHOD UTILIZING A LINKED LIST MECHANISM, having a filing date of Dec. 18, 1995, that application having a common assignee and one or more common inventors and being incorporated herein by reference.

FIELD OF THE INVENTION

The present invention relates generally to the field of telecommunications systems, and more particularly to an adaptive time slot scheduling scheme for end-points in ATM networks.

BACKGROUND OF THE INVENTION

Asynchronous Transfer Mode (ATM) networks allow a large number of data flow paths or Virtual Channels (VCs) to be statistically multiplexed over a common link. A high speed ATM connection allows a host end-point device, for example, a computer, to have a large number of simultaneous virtual channels sharing bandwidth of the common link. A challenge in implementing the large number of virtual channels is to achieve specified Quality of Service (QOS) for each virtual channel independent of other virtual channels. The challenge is compounded when a mix of virtual channels with differing requirements for the QOS have to be satisfied.

In order to efficiently accommodate the differing QOS requirements of multiple virtual channels, a scheduler in an end-point device should be able to respond quickly to changes in transmission rates on the individual virtual channels. This is required, for example, for the Variable Bit Rate (VBR) and the best effort or Available Bit Rate (ABR) classes of service. The scheduler should also be able to dynamically adjust the scheduling when new virtual channels are added or old ones are removed or existing virtual channels stop or start sending data temporarily. In addition, the scheduler should also minimize the jitter, that is, changes in cell rate. This is important because ATM switches, which receive streams of cells generated by the scheduler, continuously monitor each VC using a leaky bucket algorithm or Generic Cell Rate Algorithm (GCRA) to check if the switch is adhering to the traffic contract. In the event the leaky bucket overflows, the cells can potentially be dropped by the switch. Accordingly, the scheduler should protect against this by minimizing the jitter. In case of constant bit rate (CBR) channels, a buffer is required at the receiving end to remove the jitter and smooth the incoming flow of cells. Increased jitter will then require a larger buffer.

Scheduling schemes have been proposed in the prior art for scheduling VCs within a switch and within an end-point. Heretofore, these schemes have been unable to meet the requirements necessary for efficient implementation of multiple virtual channels having various transmission rates and differing QOS guarantees. Accordingly, there is a need for a scheduling mechanism capable of implementing specified transmission rates for each virtual channel independent of other virtual channels, wherein the virtual channels include a mix of differing QOS requirements.

SUMMARY OF THE INVENTION

The present invention discloses an apparatus and method for adaptive time slot scheduling of communications traffic generated by an end-point host in an ATM network. Asynchronous Transfer Mode (ATM) networks allow a large number of Virtual Channels (VCs) to be statistically multiplexed over a common link. In order to satisfy the specified Quality of Service (QoS) for each VC, the present invention scheduler utilizes a time slot ring, wherein the scheduler dynamically fills in the various slots of the time slot ring with different VCs to be serviced.

In one preferred embodiment of the invention, the scheduler includes a time slot ring, a VC table and a pending queue. The time slot ring is an array, wherein each element represents a time slot. Each slot contains a pointer which contains the virtual channel identifier (VCID) which is to be serviced in this time slot. The VC table is an array of all the VC descriptors. The pending queue is used for queuing a new VC and also at a later time, when the scheduler is unable to find a time slot for a VC it is queued in the pending queue.

The scheduler reads and processes one slot at a time at the maximum speed that the physical link will allow The scheduler circularly services the slots in the ring continuously and a current slot pointer (CSP) points to the slot being serviced. For the current time slot, the scheduler first services the VC waiting on this slot, then schedules a new target time slot for this VC after marking the current slot empty.

In an alternate preferred embodiment of the pre sent invention, the time slots within the ring are grouped into clusters. Each cluster holds "Cluster_size" number of slots. The ring contains cluster pointers which point to the first VC to be serviced. The rest of the VCs in the cluster are linked to the first VC. In order to accommodate different classes of service, each entry in the ring holds two cluster pointers: the High priority Pointer (HPP) which services the VBR/CBR traffic classes and a Low Priority Pointer (LPP) which services VCs belonging to the ABR/UBR classes.

In calculating the target slot, the scheduler calculates the target cluster and not the exact target slot. A Current Cell Time Pointer (CCTP) increments every cell time and points to the cell position which will be sent if the scheduler is not backlogged. A set of Current Slot Pointers (CSHPP and CSLPP) point to the current slot which is being serviced

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION

Figure 1:
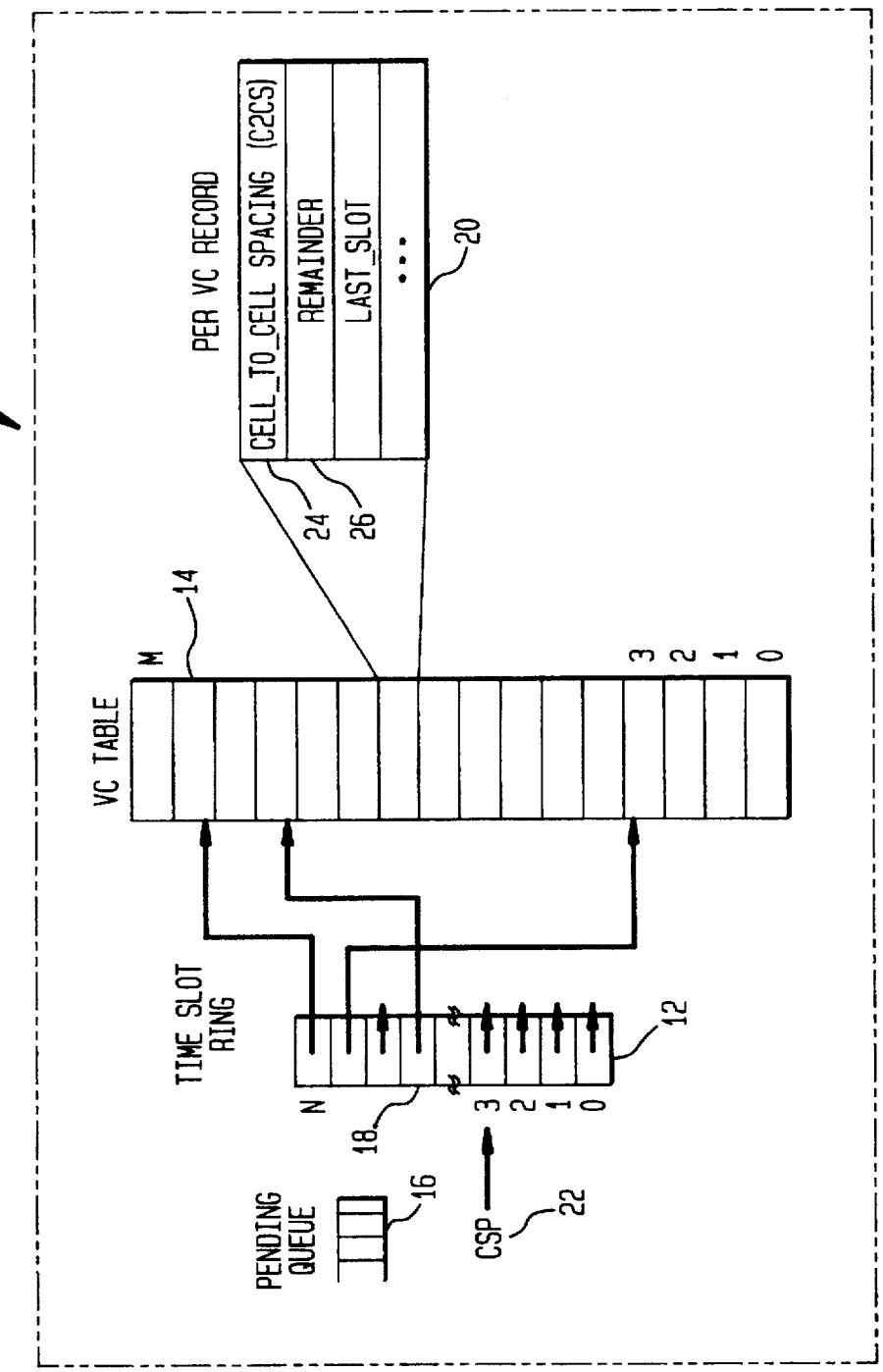
FIG. 1 shows a diagram of basic elements included in the present invention adaptive time slot scheduling mechanism.

The present invention discloses an apparatus and method for adaptive time slot scheduling at end-points in an ATM network. Referring to FIG. 1, there is shown a block diagram illustrating one preferred embodiment of a scheduling mechanism 10 according to the present invention. As shown, the scheduling mechanism or scheduler 10 is contained, for example, in an end-point host of an ATM network. The scheduler 10 includes three basic components, a time slot ring 12, a VC table 14 and a pending queue 16. The time slot ring 12 is essentially an array found in memory, for example, wherein each element in the array represents a specific time slot 18. Each time slot 18 contains a pointer which includes the virtual channel identifier (VCID) which identifies the virtual channel to be serviced in this time slot. The VCID points to a VC descriptor 20 in the VC table 14 which stores all the information regarding the specific VC. If the slot 18 is empty, a null pointer is contained therein.

As mentioned, a VC descriptor 20 is contained in the VC table 14, wherein the VC table is essentially an array of all the VC descriptors. The pending queue 16 is a queue of VCIDs and is used for queuing a new VC. In addition, when the scheduler 10 is unable to find a time slot for a VC, the VC is queued in the pending queue 16. In a preferred embodiment of the present invention, the scheduler is included as part of a Segmentation and Reassembly (SAR) ASIC.

In the basic operation of the scheduler 10 shown in FIG. 1, the scheduler 10 in conjunction with a built-in processor reads and processes one slot at a time in the time slot ring at a predetermined rate, for example, the maximum speed that the physical link of the end-point device will allow. The scheduler 10 then circularly services the slots in the ring 12 in a continuous fashion. A current slot pointer (CSP) 22 points to the slot being serviced. For a current time slot, i.e., the slot referenced by the CSP, the scheduler 10 first services the VC waiting on or waiting in this slot, the scheduler 10 then schedules a new target time slot for this VC after marking the current slot empty.

As can be seen from the above description, the functions of the scheduler and transmitter (for transmitting ATM cells) are essentially combined in the present embodiment. Since the scheduler 10 is servicing the ring 12 at the fixed outgoing link rate, the difference between the current slot and the previous slot in which a VC was serviced equals a cell-to-cell spacing measured in terms of the link cell rate. This parameter called the cell to cell spacing (C2CS) 24 is part of the VC descriptor 20 and is used by the scheduler 10 to achieve a given cell rate for each VC. As an example, if the link cell rate is LR cells/sec and the required cell rate for a VC is RCR cells/sec then the cell-to-cell spacing required is C2CS=LR/RCR.

When the scheduler 10 calculates a new target time slot, the scheduler first checks to see if the target slot is empty. If the target slot is empty, the current VCID is copied to the new slot. If the slot is not empty, i.e., a non-empty slot being indicative of a collision, the current VC is queued in the pending queue 16. This VC will be serviced later when the scheduler encounters an empty slot. If the current slot is found to be an empty slot, then the scheduler 10 checks the pending queue 16. If the pending queue 16 is non-empty, the first VC in this queue is serviced. If the pending queue 16 is also empty, an "unassigned" cell or a dummy cell is sent or transmitted on the output link.

Due to the fact that there may be collisions, and a VC may go into the pending queue 16, the cell-to-cell spacing of the present embodiment will not exactly match the required cell-to-cell spacing. In order to correct the rate, a new variable called the remainder 26 is introduced in the VC descriptor 20. The scheduler 10 accumulates the difference between the required cell-to-cell spacing (C2CS) and the actual spacing present slot minus previous slot) in this variable. When scheduling, the remainder is first added to the C2CS and then to the CSP to arrive at a corrected target slot. If the target slot exceeds the ring size, then it wraps around to the beginning of the ring. This "remainder" mechanism ensures that over the long term, the cell-to-cell spacing averages to the required spacing. This may also, however, result in an altering of the spacing between the cells, thereby producing jitter. This jitter is acceptable as long as the resulting cell stream passes the criteria of the GCRA (Generic Cell Rate Algorithm) being implemented, wherein the GCRA monitors that a specific device is adhering to its service contract.

As would be understood by a person skilled in the art, it is important to be able to change the cell rate of the scheduling mechanism for different services such as Variable Bit Rate (VBR) and Available Bit Rate (ABR). A change in the rate should not, however, involve undue overhead. The present invention adaptive time slot scheduler 10 is particularly suited in this respect, in that changing the rate, is accomplished by simply changing the C2CS parameter in the VC descriptor 20. The scheduler 10 will start scheduling at the new rate starting with a next cell in the stream. This becomes clear when it is considered that a given VC is present at most in one slot in the time slot ring 12 at any given time.

Call admission, that is, the number of calls admitted over a link in the network, plays an important role in the effectiveness of the instant scheduling algorithm in its ability to ensure Quality of Service (QoS). Call admission is required to monitor the total amount of bandwidth that is taken by all the VCs combined and to make sure that the QoS values do not suffer. As would be understood, the number of collisions increases with an increase in the percentage utilization of the link. Thus, a call admission control found in a higher level of software limits the link utilization to a level which depends on the desired QoS. The simulation results presented herein illustrate some of these effects.

As would be understood, the ring size is also very important for implementation of the present invention scheduling scheme. The number of slots in the time slot ring 12 of the present invention is determined by the VC with the lowest cell rate. As an example, consider the requirement for a link speed of 622 Mbps (which translates to a cell rate of 1.41 Mcells/sec after considering the framing and ATM layer overheads). If a minimum rate of 64 Kbps is assumed, which translates to a cell rate of 170 cells /sec. The minimum ring size then becomes 1.41M/170=8294 slots. Accordingly, if a cell is sent once in every 8294 time slots, the effective rate for this VC will be 64 Kbps. Thus, a ring of this size is sufficient to support rates down to 64 Kbps. Ideally, the ring should be kept in an external control memory and the smaller the size of the ring the better in terms of meeting desired performance criteria. In a preferred embodiment of the invention the ring will be small enough to fit in an on-chip cache. This will save a large number of accesses to the external control memory.

When examining the present invention adaptive time slot scheduling scheme described with respect to FIG. 1, it can be seen that the basic scheme described may very well have a significant collision rate, i.e., when the target slot is not empty, especially when the link utilization is high. In order to reduce the collision rate, two different approaches can be taken. A second preferred embodiment of the present invention scheduling mechanism looks for the target slot in a range of slots and is described below.

In the second preferred embodiment of the present invention, when the scheduler encounters a collision, instead of looking at one target slot, the scheduler looks at N consecutive slots starting at the target slot. The scheduler then takes the first available empty slot in this range and considers this to be the target slot. Any error introduced in the cell to cell spacing (C2CS) due to implementation of this scheme will automatically be corrected using the "remainder" mechanism previously described. On its face, the instant scheme looks very costly to implement, since it involves searching N different slots. However, the hardware implementation can be sped up as described.

Figure 2:
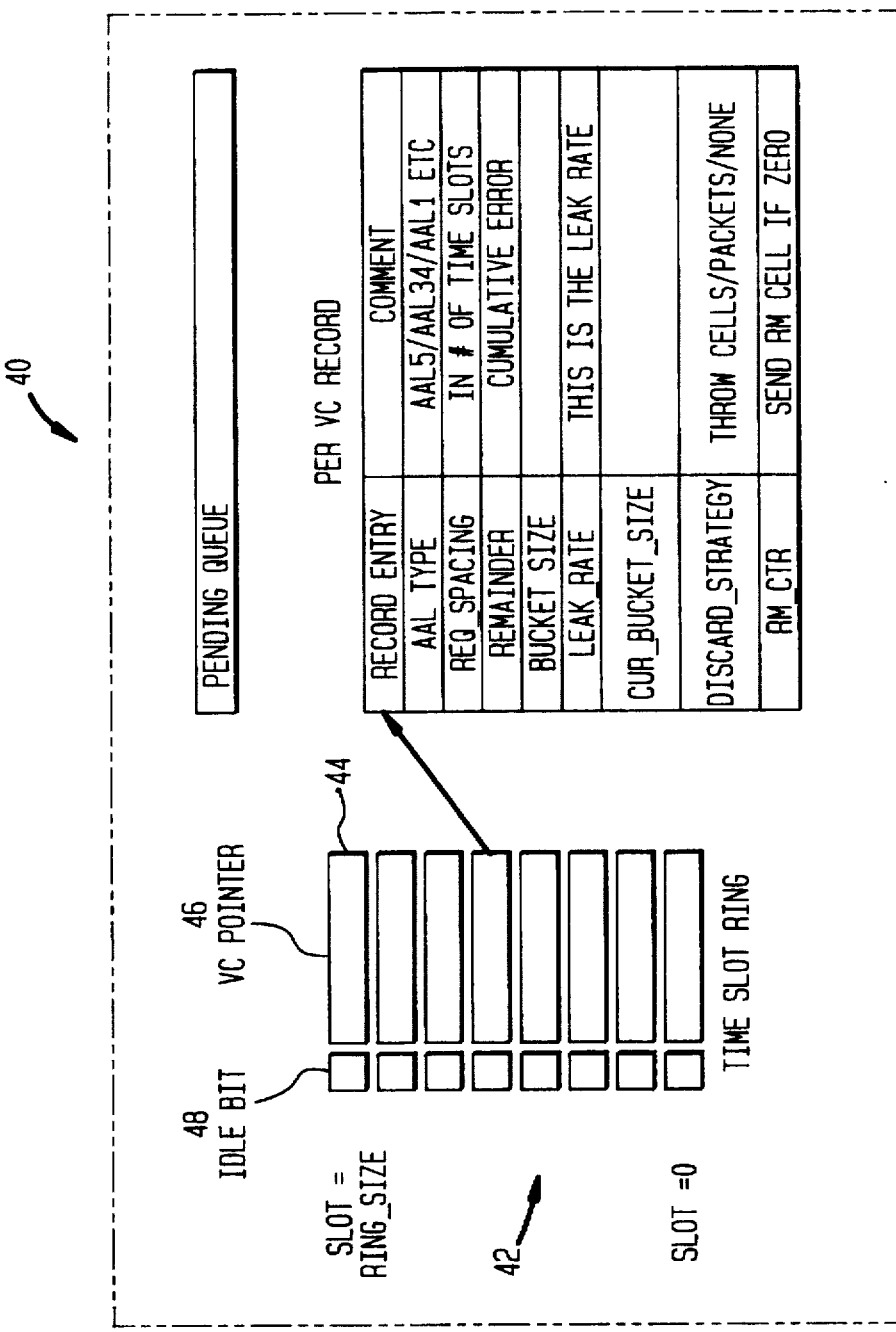
FIG. 2 shows an alternate implementation of a time slot ring according to the present invention.

A preferred hardware implementation of the slot ring 42 for the scheduler 40 of the instant embodiment is shown in FIG. 2. Here, a separate Boolean variable called the "empty bit" is included for every slot in the time slot ring. Each slot 44 now contains a VCID 46 and an empty bit 48. In a next step, the ring 42 is split into two separate structures, one containing only the VCIDs 46 and the second containing only the corresponding empty bits 48. Recognizing that in a typical implementation, the external memory interface is 32 bits wide, 32 consecutive empty bits can be packed into one 32 bit word. Every time the empty bit array is read, the scheduler will get 32 consecutive empty bits from the array. Accordingly, once the scheduler has at its disposal 32 consecutive empty bits, it is possible to extract the index corresponding to the first empty bit using combinatorial logic, as would be understood by one skilled in the art.

In accordance with the present invention, the scheduler makes a large number of accesses to the time slot ring. As would be understood, it is preferable to have the ring entirely in the internal cache of the SAR chip thereby reducing the number accesses to the external control memory. The size of the ring for a link speed of 622 Mbps, for example, represents 8K entries→16 KB of memory, which is difficult to fit into an internal cache. Accordingly, it would be advantageous to reduce the ring size while at the same time preserving the level of performance.

Figure 3:
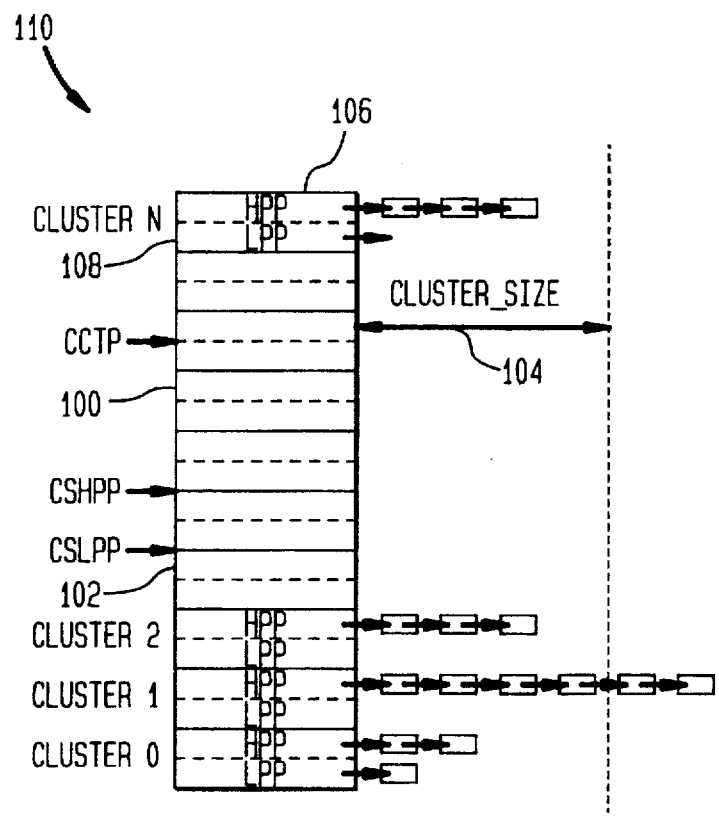
FIG. 3 shows a second alternate embodiment for a time slot ring according to the present invention.

Referring to FIG. 3, there is shown a time slot ring 100 according to a third preferred alternate embodiment of the present invention scheduling mechanism. In the embodiment of FIG. 3, the time slots within the ring 100 are grouped into clusters 102, wherein the ring includes cluster 0 through cluster N. Each cluster nominally holds a number of slots indicative of a Cluster_size 104. The time slot ring 100 of the instant embodiment contains VCIDs which point to a first VC to be serviced in the cluster. The remaining VCs in a cluster are linked to the first VC via the pointers. In order to accommodate different classes of service, each entry in the ring holds two specific VCIDs: a High Priority Pointer (HPP) 106 which services the VBR/CBR traffic classes and a Low Priority Pointer (LPP) 108 which services VCs belonging to the ABR/UBR classes. Assuming an arbitrary cluster size of 32, for example, the ring size can now be reduced in size by 32 times.

In calculating a target slot, the scheduler 110 used in conjunction with the time slot ring 100 now calculates a target cluster and not the exact target slot. The resultant inaccuracy as has been explained previously, can be corrected through the use of the remainder mechanism. A similar correction is accomplished in the embodiment of FIG. 4. A Current Cell Time Pointer (CCTP) 112 increments every cell time and points to the cell position which will be sent if the scheduler was not backlogged. In a similar fashion, a Current Slot High Priority Pointer (CS HPP) 114 and the Current Slot Low Priority Pointer (CSLPP) 115 point to the current high priority and currently low priority slots, respectively, which are being serviced.

In describing the operation of the scheduling mechanism 110 shown in FIG. 3, it will be understood that the scheduler can be in one of the two states: backlogged or normal. In the normal state, for every increment of the CSHPP or CSLPP 114, the CCTP 112 increments by cluster_size, since a number of cells equal to cluster_size have been sent. Accordingly, the normal state is defined as the case when CSHPP and the CCTP/cluster_size value will be in step or in synch with each other. The CSLPP is not considered in determining the state of the scheduler. The scheduler 110 will then first service the high priority queue followed by the low priority queue. If the total number of cells in high priority and low priority queues combined, is less than the cluster size, unassigned cells are sent to make up the remainder.

The backlogged case is when the CCTP/Cluster_size value>CSHPP. In this case, the scheduler 110 will service only the high priority queue. If a cluster 102 is empty, an unassigned cell will be emitted and the CCTP incremented before proceeding to the next cluster. This avoids the empty cluster look ahead requirement, but the trade off is that the scheduler 110, in effect, wastes or does not use one cell time for every empty cluster while it is backlogged. In connection therewith, the fraction of bandwidth not used is then at most (1/cluster_size), as will be explained.

Assume that the ring 100 has a capacity to hold R cells. The number of clusters in the ring is therefore (R/cluster_size). A worst case for the ring will be when the scheduler has to check all the clusters of the ring and wastes one cell time for every cluster. Accordingly, the fraction of cells wasted is (R/(cluster_size*R)=1/cluster_size, as presented above.

Assuming a cluster size of 32, for example, the scheduler 110 will waste 1/32 of the total bandwidth or about 3%. If the higher level call admission control can ensure that no more than 97% of the bandwidth is allotted, the scheduler is then guaranteed to recover from the backlogged condition within one iteration through the ring.

When a target slot is calculated, in the embodiment of FIG. 3, if the target slot turns out to be the current slot itself, then the target slot can only be put in cur_slot+1. This holds true for all the virtual channels whose cell to cell spacing is less than the cluster size. This problem is solved by defining another variable called burst_size. In the above example, every time the current cell comes up for transmission, a burst of cells is sent. The C2CS is then adjusted so that the effective rate equals the required rate. A similar problem is encountered when the remainder becomes negative and exceeds the C2CS. The scheduler can correct this by temporarily bursting one extra cell, and adding an amount equal to C2CS to the remainder variable.

The scheduling scheme presented in connection with FIG. 3 has a strict upper limit on the number of accesses to the control memory per cell. As can be seen, however, the total memory required for the ring is now substantially reduced. Again considering the design for a 622 Mbps link, assuming a cluster size of 32 cells, the ring size required is only 8294/32~256. Assuming two bytes for the VCID, and two such pointers for high and low priority, we arrive at 1024 bytes. Such a memory requirement can easily be met by the internal cache of the SAR chip. Since most of the accesses of the scheduler are to the ring 100, a substantial reduction in the number of external accesses to the control memory is achieved.

In order to support other services, such as ABR, some additional requirements are placed on the scheduler 110 presented in FIG. 3. Although, the scheduler 110 has more flexibility in allotting a time slot for an ABR VC, the scheduler, however, should also support the rate based congestion control required on the ABR VCs. The congestion control scheme requires that a Resource Management (RM) cell be sent once in every N cells, wherein a value of "N" is determined at the time of call set up. A cell counter is provided in the per-VC descriptor and the scheduler emits an RM cell once in every N normal cells whenever the VC has traffic. As soon as the VC queue becomes empty, the scheduler starts a timer and emits an RM cell when the timer expires. A typical exemplary timer value, for example, is 100 milliseconds.

As would be understood, the ABR VC can keep hopping between different rates depending on the congestion control algorithm. The rate will be modified by a re-assembly engine when it gets back the RM cells which inform the scheduler to either reduce or increase the rate. The re-assembly engine then calculates the required inter-cell gap, in terms of the number of time slots, and fills up the C2CS variable in the per VC record. The scheduler then automatically adapts to the new rate.

In the third preferred embodiment described in connection with FIG. 3, the ABR traffic which is on the low priority queue is serviced only after the high priority queue is serviced. In the event the scheduler is back logged, the low priority queue is not serviced. Since achieving an exact bit rate is not critical for the ABR channels, the remainder mechanism can possibly be turned off for these VCs.

As would be understood, the idea of having two queues: one for low priority and one for high priority can be extended to have a greater number of queues to provide for a larger number of traffic classes. This would only be possible, however, at the expense of increased memory requirements.

In considering latency with respect to the present invention scheduling mechanism, it is known that some applications such as multiprocessing use a local ATM network to interconnect a group of work stations. These applications require VCs with very low latency. There are three main sources which contribute to the latency end-to-end. First, latency due to the protocol stack at the end point work stations. This has to be minimized by bypassing the regular stack for these low latency VCs. Second, latency in the network interface card, which includes the scheduling delay and the delay due to queuing of the cells after scheduling to increase the throughput. Third, the latency suffered in the ATM switching network.

The first source of latency within a network interface card is due to the scheduling delay. The solution to this problem is to create a separate queue reserved for the low latency VCs. Thus, for every cell time, the scheduler should first look at the low latency queue before servicing any other queue. Accordingly, the low latency queue has the highest priority. Also while the scheduler is servicing the low latency queue, the CCTP keeps incrementing. The remainder mechanism will ensure that the transmit rate of the VCs on the high priority queue will not suffer as long as the low latency traffic is kept small in comparison to the other traffic. The other possible source of latency is the queue of cells after the scheduler. A small queue of cells is usually kept to "smooth" the traffic and take care of possible delays in scheduling due to overloading of the control memory bus or the host bus. For the present invention, this queue should be kept to the absolute minimum size.

A simulation was performed utilizing the various embodiments of the scheduling scheme for the present invention. For the first preferred embodiments, a link speed of 622 Mbps was assumed, as was a mix of 20 Mbps, 1 Mbps and 64 Kbps VCs in the ratio of 1:5:25. The VCs were all created at the beginning of the simulation, wherein a series of simulations were run to look at the effect of parameters on the performance of this algorithm. All the VCs were assumed to be Constant Bit Rate (CBR), i.e., they never run out of data to send. These assumptions simplify the simulation code and represent a worst case situation for the scheduler. Simulations for the other alternative embodiments were done with the same set of assumptions for ease of comparison.

When comparing the performance of different embodiment schedulers, a common performance measure is needed. Two measures used during the simulations were the elastic buffer size and the minimum leaky bucket size, each of which is explained below.

Figure 4:
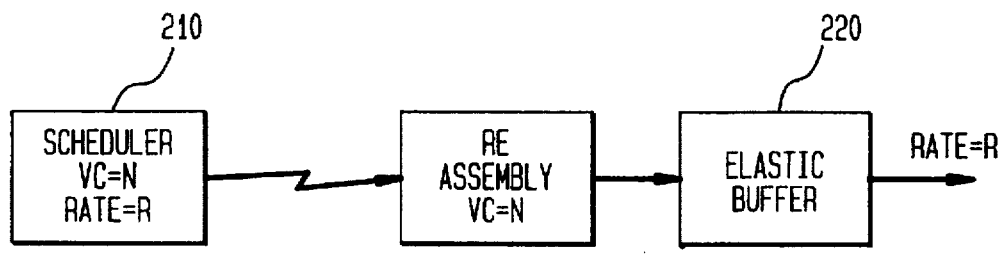
FIG. 4 illustrates the use of buffer size as a performance criteria for the present invention.

The elastic buffer size assumes that a rate of R cells/sec is specified on the virtual channel N. Ideally the scheduler 210 should emit one cell every 1/R seconds spacing. Since some amount of jitter or variation is unavoidable, an elastic buffer 220 should be provided as shown in FIG. 4 at the receiving end in order to remove the jitter. Assume that the elastic buffer is being drained at exactly the rate R and that the elastic buffer is half full at the time the connection is setup. The jitter will result in increases and decreases of the elastic buffer. The minimum size of the elastic buffer needed which will neither underflow nor overflow is indicative of the amount of jitter and can be used as a performance measure.

Leaky Bucket size assumes that the virtual channel N with a nominal rate R is subjected to the leaky bucket algorithm. Assume that the drain rate on the bucket is exactly R. For some values of the bucket size the bucket will overflow. The minimum size of the bucket (in number of cells) which will not overflow indicates the quality of the scheduler. This number can be used as a performance measure. The Elastic buffer size, however, is a more stringent measure of the two.

Figure 5A:
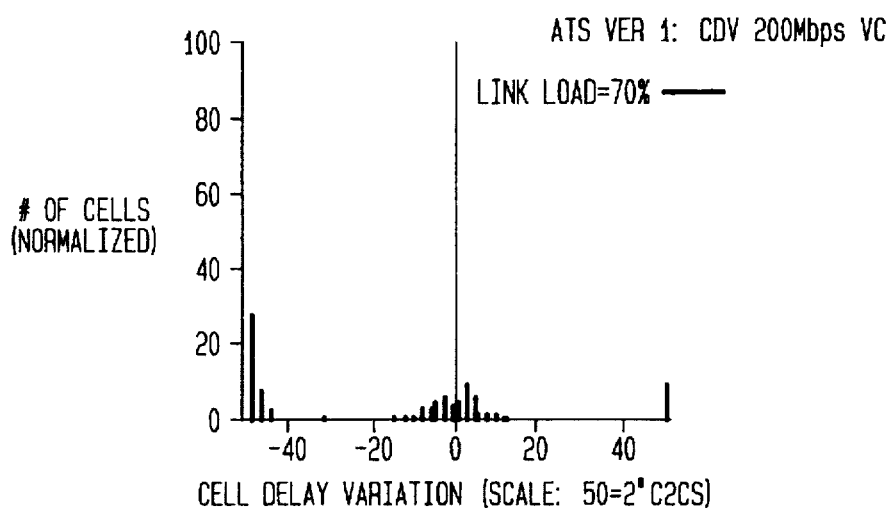
FIGS. 5A–5E show exemplary test results for the various embodiment schedulers of the present invention.
Figure 5B:
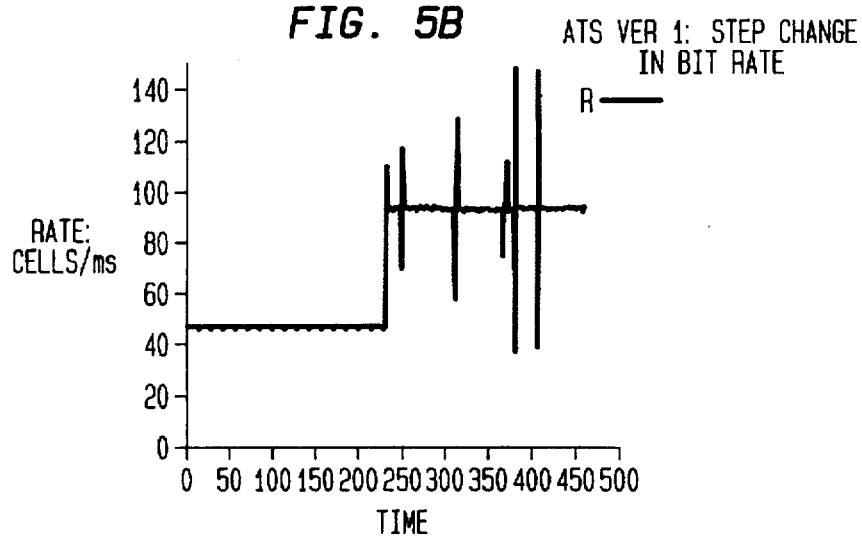

The results indicate that for bit rates below 1 Mbps, the scheduler of FIG. 2 performed close to ideal. FIG. 5A shows the normalized cell delay variation 300 for a 20 Mbps VC when the link is loaded to 70% of it's capacity. FIG. 5E shows the minimum elastic buffer 350 needed at different link loads, whereas FIG. 5B shows the effect on the output cell rate of the virtual channel when the cell to cell spacing is changed.

Figure 5C:
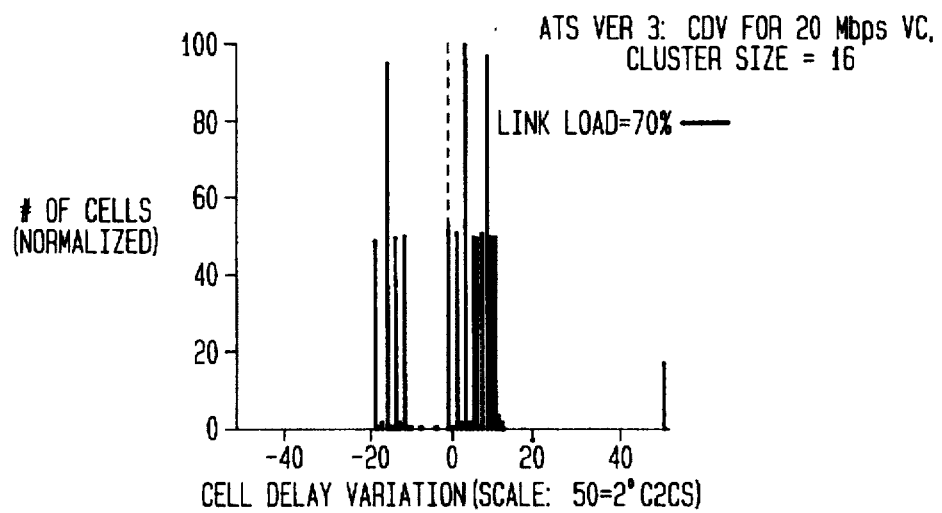
Figure 5D:
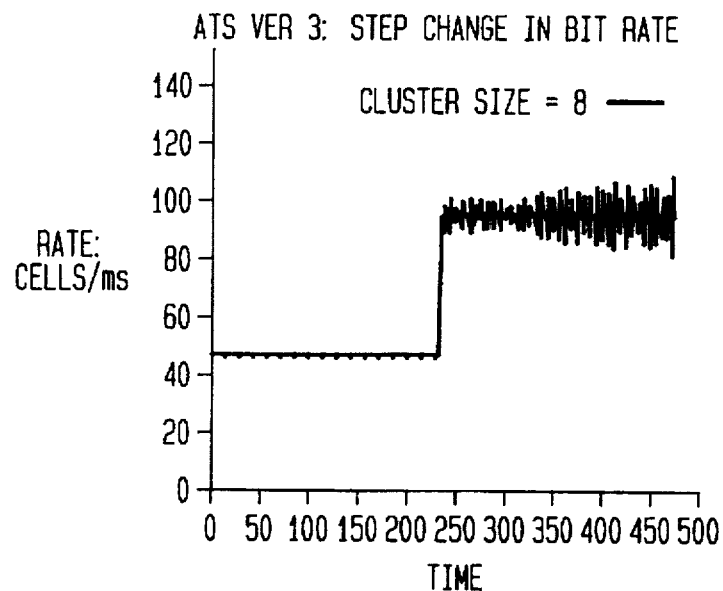
Figure 5E:
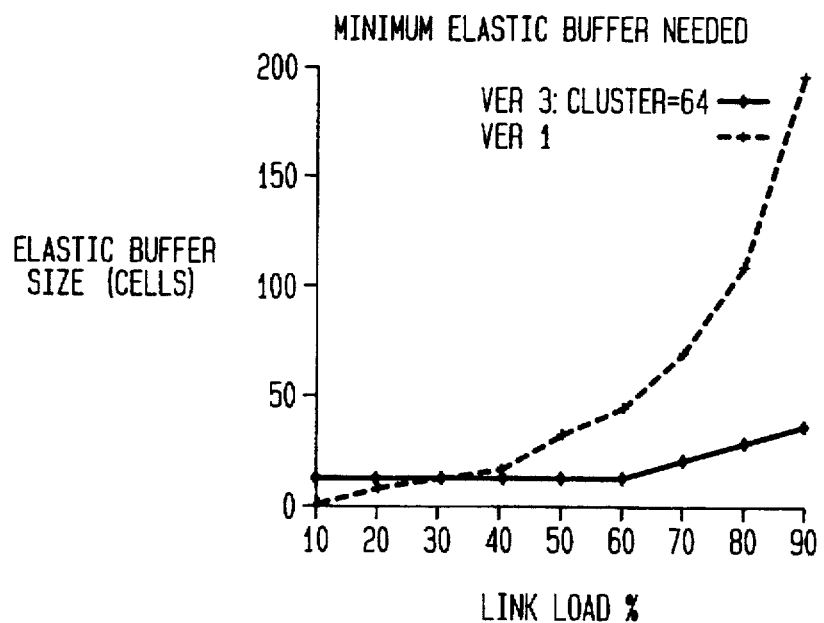

The simulation results for the third preferred embodiment of the present invention are shown FIGS. 5C, 5D and tables 1, 2 and 3. FIG. 5C shows the cell delay variation for the present invention scheduler of FIG. 3. As compared to scheduler shown in FIG. 1, the spread would appear to be less. FIG. 5D shows the variation in the bit rate when the cell-to-cell spacing is changed. Again compared to the embodiment of FIG. 1, the adherence to new speed seems to be better. FIG. 5E shows the elastic buffer size 360 needed at various link utilization figures. The embodiment presented with respect to FIG. 3 seems to perform better in this respect also.

In addition, TABLE 1 shows how the minimum leaky bucket size is affected when the cluster size is varied for the scheduler of FIG. 3. As the cell stream passes through the ATM network, the bucket size requirements are likely to increase as further "clumping" of the cells will take place. These figures should be used in conjunction with the figures for the ATM net work to arrive at an acceptable cluster size. TABLE-2 shows how the required minimum elastic buffer size changes as the cluster size is varied. As would be understood, these figures are relevant only for CBR/VBR channels. TABLE-3 gives the burst sizes that need to be used when the cluster size is increased.

TABLE 1

Minimum leaky bucket size (# cells)

| Bit Rate | Cluster size | | | | |
|---|---|---|---|---|---|
| | 1 | 8 | 16 | 32 | 64 |
| 1 Mbps | 2 | 2 | 2 | 2 | 2 |
| 10 Mbps | 2 | 2 | 2 | 2 | 4 |
| 20 Mbps | 2 | 2 | 4 | 4 | 8 |
| 50 Mbps | 10 | 10 | 12 | 14 | 14 |
| 108 Mbps | 18 | 18 | 18 | 22 | 26 |
| 270 Mbps | 12 | 14 | 16 | 24 | 32 |

TABLE 2

Minimum Elastic buffer size (# cells)

| Bit Rate | Cluster size | | | | |
|---|---|---|---|---|---|
| | 1 | 8 | 16 | 32 | 64 |
| 1 Mbps | 4 | 4 | 4 | 4 | 4 |
| 10 Mbps | 4 | 4 | 4 | 4 | 8 |
| 20 Mbps | 12 | 12 | 12 | 12 | 16 |
| 50 Mbps | 36 | 36 | 36 | 36 | 32 |
| 108 Mbps | 64 | 60 | 60 | 68 | 60 |
| 270 Mbps | 44 | 44 | 48 | 64 | 64 |

TABLE 3

Burst size (# cells)

| Bit Rate | Cluster size | | | | |
|---|---|---|---|---|---|
| | 1 | 8 | 16 | 32 | 64 |
| 1 Mbps | 1 | 1 | 1 | 1 | 1 |
| 10 Mbps | 1 | 1 | 1 | 1 | 2 |
| 20 Mbps | 1 | 1 | 1 | 2 | 3 |
| 50 Mbps | 1 | 1 | 2 | 4 | 7 |
| 108 Mbps | 1 | 2 | 4 | 7 | 13 |
| 270 Mbps | 1 | 4 | 8 | 16 | 32 |

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. An apparatus for scheduling communications traffic from an end-point host over an ATM network, said apparatus comprising:

a time slot ring including an array of time slots, wherein each of said time slots includes a virtual channel identifier (VCID) of a virtual channel (VC) to be serviced;

a VC table including an array of VC descriptors, wherein said VCID stored in said time slot ring points to a VC descriptor in said VC table; and processing means for scheduling said VCs in said time slots of said time slot ring, wherein said time slots are circularly processed in a continuous fashion enabling scheduled transmission of ATM cells over an output link in said network, wherein said VC descriptor includes a remainder variable defined as the accumulated difference between required cell-to-cell spacing and actual cell-to-cell spacing for said VC, said remainder variable operable to ensure that said actual cell to cell spacing averages to said required cell-to-cell spacing.

2. The apparatus of claim 1, further including a pending queue for queuing VCs prior to placement in one of said time slots.

3. The apparatus of claim 1, further including a current slot pointer (CSP) for pointing to a current slot being serviced in said time slot ring, said processing means being operable to service said VC referenced by said CSP and to schedule a new target time slot for said VC after marking said current slot empty.

4. The apparatus of claim 2, wherein a cell rate in said time slot ring is altered for different quality of service requirements by altering a cell to cell spacing parameter in said VC descriptor.

5. An apparatus for scheduling communications traffic from an end-point host over an ATM network, said apparatus comprising:

a time slot ring including an array of time slots, wherein each of said time slots includes a virtual channel identifier (VCID) of a virtual channel (VC) to be serviced;

a VC table including an array of VC descriptors, wherein said VCID stored in said time slot ring points to a VC descriptor in said VC table; and processing means for scheduling said VCs in said time slots of said time slot ring, wherein said time slots are circularly processed in a continuous fashion enabling scheduled transmission of ATM cells over an output link in said network, wherein said processing means is operable to check if a target slot in said time slot ring is empty, a non-empty slot being indicative of a collision, a current VC being queued in said pending queue if said target slot is non-empty, wherein a next VC in said pending queue is serviced upon encountering an empty slot in said time slot ring, said processing means searching N consecutive time slots in said time slot ring upon encountering said collision to locate an empty target slot.

6. The apparatus of claim 5, wherein each said time slot in said time slot ring includes an empty bit variable, said empty bit variable indicative of whether said time slot is occupied.

7. The apparatus of claim 1, wherein each of said VC descriptors in said VC table includes a cell-to-cell spacing parameter for each VC, wherein said cell-to-cell spacing parameter is defined as a transmission rate of said output link divided by a required cell rate for said VC.

8. The apparatus of claim 1, further including admission control means for controlling total bandwidth required by all VCs in said time slot ring to ensure that said total bandwidth does not exceed a link speed of said output link.

9. An apparatus for scheduling communications traffic from an end-point host over an ATM network, said apparatus comprising:

a time slot ring including an array of time slots, wherein each of said time slots includes a virtual channel identifier (VCID) of a virtual channel (VC) to be serviced;

a VC table including an array of VC descriptors, wherein said VCID stored in said time slot ring points to a VC descriptor in said VC table; and processing means for scheduling said VCs in said time slots of said time slot ring, wherein said time slots are circularly processed in a continuous fashion enabling scheduled transmission of ATM cells over an output link in said network, wherein said time slot ring is divided into a plurality of clusters, each of said clusters including a predetermined number of slots indicative of a cluster_size, wherein each of said clusters includes at least first and second pointers of differing priority for accommodating transmission under various classes of service from said end-point host, wherein multiple VCs for said first and second pointers in each of said clusters are linked to one another.

10. The apparatus of claim 9, further including a current cell time pointer (CCTP), a current slot high priority pointer (CSHPP) and current slot low priority pointer (CSLPP), wherein only higher priority queues associated with said first and second pointers of each of said clusters are serviced during a backlog condition in said time slot ring, said backlog condition being defined as a CCTP value/cluster_size>a CSHPP value.

11. The apparatus of claim 10, wherein if a current cluster is empty, said processing means emits an unassigned cell before proceeding to a next cluster.

12. The apparatus of claim 11, further including a burst_size variable, wherein each time a calculated target slot equals a current slot, a burst of cells according to said burst_size variable is transmitted over said output link.

13. The apparatus of claim 10, wherein said current slot high priority pointer (CSHPP) and said current slot low priority pointer (CSLPP) are operable to point to current high priority and current low priority slots, respectively, which are currently being serviced.

14. The apparatus of claim 1, wherein said time slot ring is included in internal cache of a segmentation and re-assembly (SAR) applications specific integrated circuit (ASIC).

15. A method for scheduling communications traffic over an ATM network, said method comprising the steps of
providing a time slot ring including an array of time slots, wherein each of said time slots includes a virtual channel identifier (VCID) of a virtual channel (VC) to be serviced;
referencing a VC table including an array of VC descriptors, wherein said VCID stored in said time slot ring points to a VC descriptor in said VC table, said VC descriptor including pertinent information regarding processing of a specific VC;
circularly processing said time slots of said time slot ring in a continuous fashion at a predetermined rate enabling scheduled transmission of ATM cells over an output link in said network; and
queuing VCs in a pending queue prior to placement in one of said time slots, wherein said time slot ring includes a current slot pointer (CSP) for pointing to a current slot being serviced in said time slot ring, further including the steps of:
servicing said VC in said current slot of said time slot ring referenced by said CSP; and
scheduling a new target time slot for said VC after marking said current slot empty.

16. The method of claim 15, further including the step of:
checking if a target slot in said time slot ring is empty, a non-empty slot being indicative of a collision, queuing a current VC in said pending queue if said target slot is non-empty, and
servicing a next VC in said pending queue upon encountering an empty slot in said time slot ring.

17. A method for scheduling communications traffic over an ATM network, said method comprising the steps of:
providing a time slot ring including an array of time slots, wherein each of said time slots includes a virtual channel identifier (VCID) of a virtual channel (VC) to be serviced;
referencing a VC table including an array of VC descriptors, wherein said VCID stored in said time slot ring points to a VC descriptor in said VC table, said VC descriptor including pertinent information regarding processing of a specific VC; and
circularly processing said time slots of said time slot ring in a continuous fashion at a predetermined rate enabling scheduled transmission of ATM cells over an output link in said network, wherein said time slot ring is divided into a plurality of clusters, each of said clusters including a predetermined number of slots indicative of a cluster_size, wherein each of said clusters includes at least first and second pointers of differing priority for accommodating transmission under various classes of service from an end-point host, wherein multiple VCs for said first and second pointers in each of said clusters are linked to one another.

18. The method of claim 17, wherein said time slot ring includes a current cell time pointer (CCTP), a current slot low priority pointer (CSLPP) and a current slot high priority pointer (CSHPP) to point to current low priority and high priority slots, respectively, which are being serviced, wherein only higher priority queues are serviced during a backlog conditions in said time slot ring, said backlog condition being defined as a (CCTP/ cluster_size) value>a CSHPP value.

19. The method of claim 18, including the step of emitting an unassigned cell before proceeding to a next cluster if a current cluster is empty.

20. A method for scheduling communications traffic over an ATM network, said method comprising the steps of:
providing a time slot ring including an array of time slots, wherein each of said time slots includes a virtual channel identifier (VCID) of a virtual channel (VC) to be serviced;
referencing a VC table including an array of VC descriptors, wherein said VCID stored in said time slot ring points to a VC descriptor in said VC table, said VC descriptor including pertinent information regarding processing of a specific VC; and
circularly processing said time slots of said time slot ring in a continuous fashion at a predetermined rate enabling scheduled transmission of ATM cells over an output link in said network, wherein each of said VC descriptors in said VC table includes a cell-to-cell spacing parameter for each VC, wherein said cell-to-cell spacing parameter is defined as a transmission rate of said output link divided by a required cell rate for said VC, further including the step of altering a cell rate in said time slot ring for different quality of service requirements by altering said cell-to-cell spacing parameter in said VC descriptor.

21. The method of claim 20, including the step of calculating a remainder variable for inclusion in said VC descriptor, said remainder variable defined as the accumulated difference between required cell-to-cell spacing and actual cell-to-cell spacing for said VC, said remainder variable operable to ensure that said actual cell-to-cell spacing averages to said required cell-to-cell spacing.

22. The method of claim 16, including the step of searching N consecutive time slots in said time slot ring upon encountering said collision to locate an empty target slot.

23. The apparatus of claim 5, wherein said processing means is operable to transmit a dummy cell over said output link when said target slot is empty and said pending queue is also empty.

24. The apparatus of claim 5, wherein each of said VC descriptors in said VC table includes a cell-to-cell spacing parameter for each VC, wherein said cell-to-cell spacing parameter is defined as a transmission rate of said output link divided by a required cell rate for said VC.

25. The apparatus of claim 5, further including admission control means for controlling total bandwidth required by all VCs in said time slot ring to ensure that said total bandwidth does not exceed a link speed of said output link.

26. The apparatus of claim 5, wherein said time slot ring is included in internal cache of a segmentation and re-assembly (SAR) applications specific integrated circuit (ASIC).

* * * * *